J. J. KEON.
SAWING MACHINE.
APPLICATION FILED OCT. 28, 1918.
1,318,324.
Patented Oct. 7, 1919.
3 SHEETS—SHEET 1.
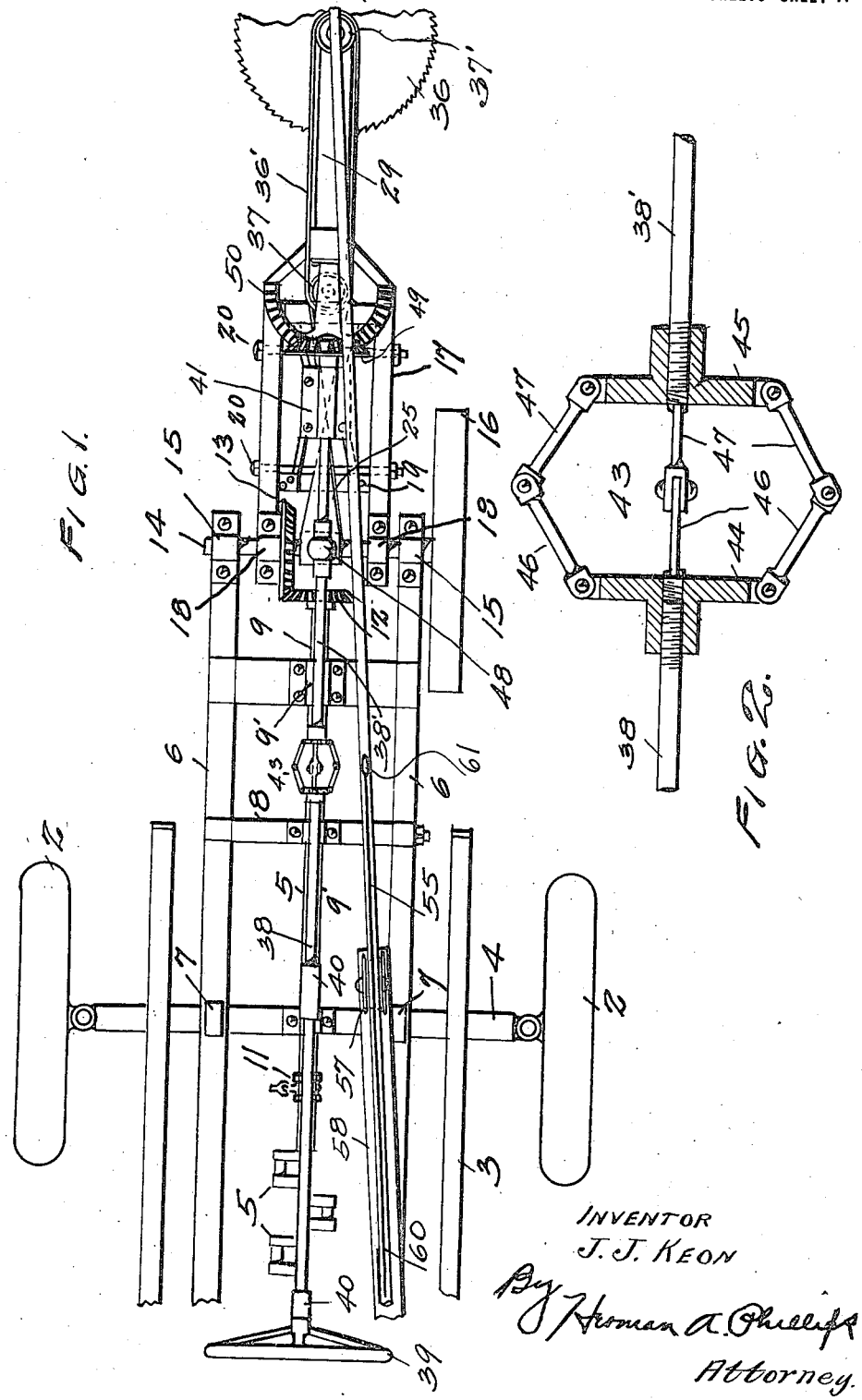
INVENTOR
J. J. KEON
By Hiram A. Phillips
Attorney.

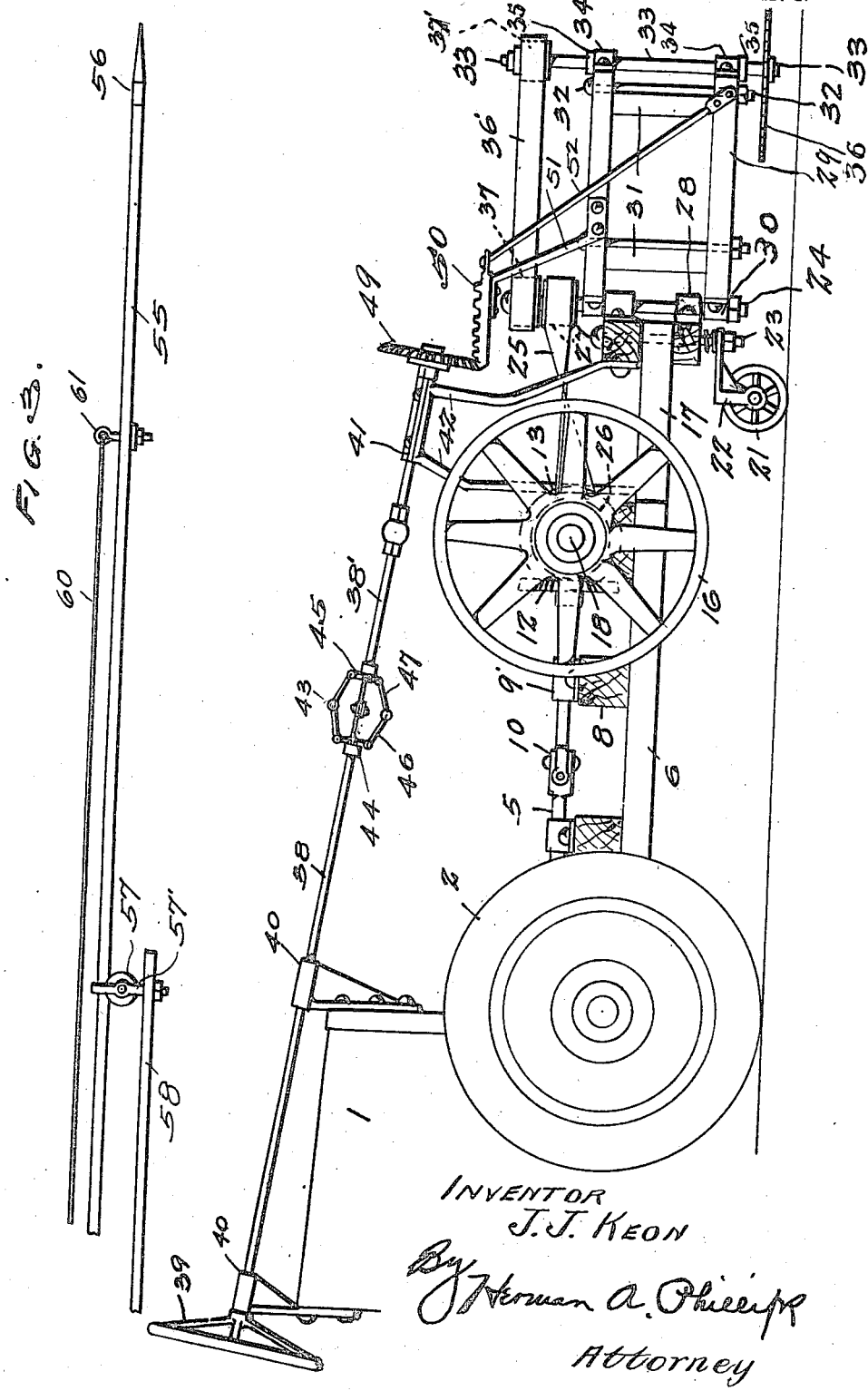

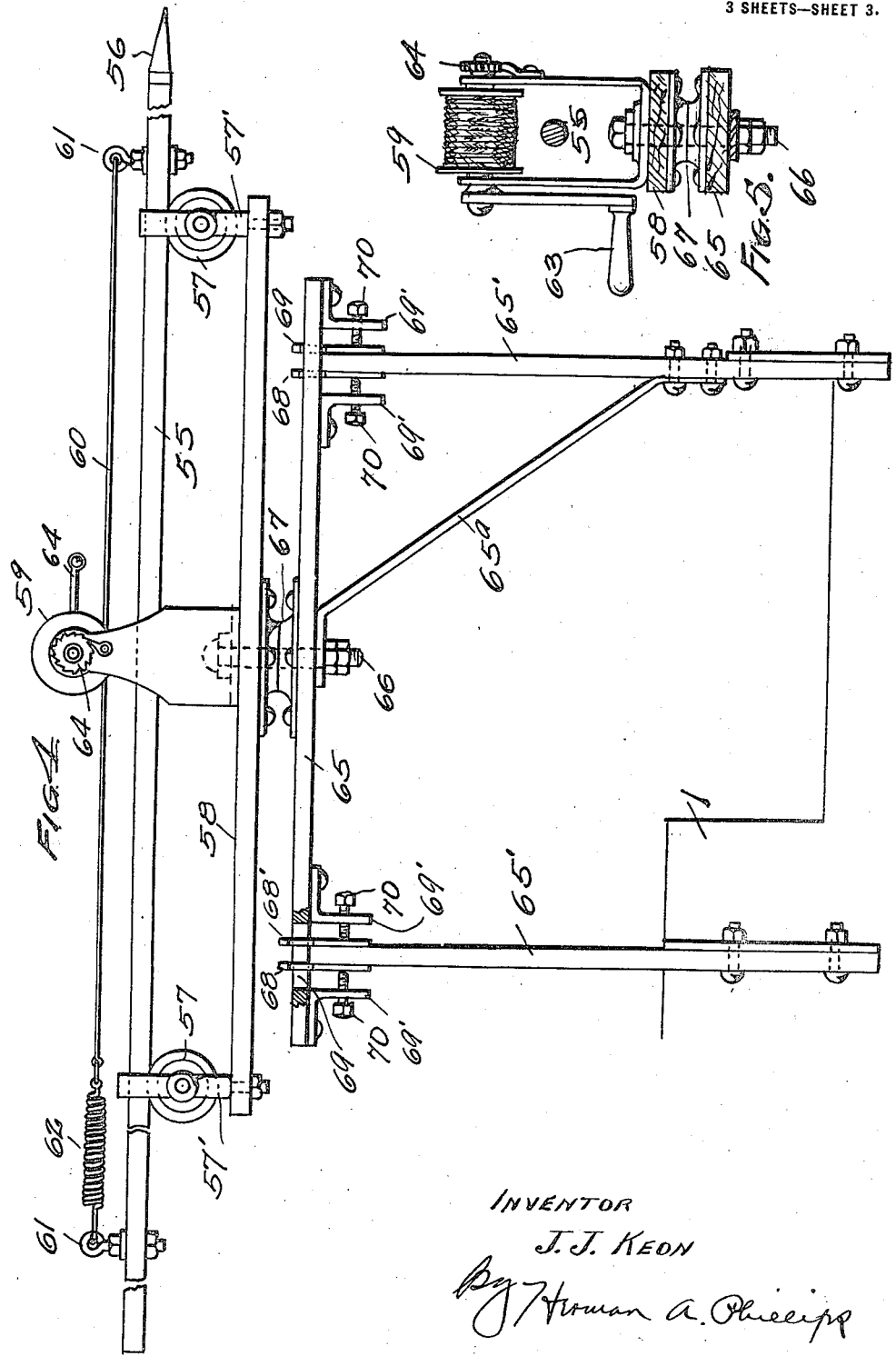

UNITED STATES PATENT OFFICE.

JOHN J. KEON, OF ST. LOUIS, MICHIGAN.

SAWING-MACHINE.

1,318,324.  Specification of Letters Patent.  Patented Oct. 7, 1919.

Application filed October 28, 1918. Serial No. 259,950.

*To all whom it may concern:*

Be it known that I, JOHN J. KEON, citizen of the United States, residing at St. Louis, in the county of Gratiot and State of Michigan, have invented certain new and useful Improvements in Sawing-Machines, of which the following is a specification.

The present invention relates to improvements in sawing machines, the primary object of the invention being the provision of a portable apparatus which may be transported with facility, is simple in construction and operation, and constructed especially with a view of attachment, either permanent or temporary, with any of the usual types of automobiles or automobile trucks.

Figure 1 is a top plan view of a sawing machine embodying the present invention.

Fig. 2 is a detail view, partly in section, of the expansion joint in the steering rod for the saw.

Fig. 3 is a side elevation of the machine, part being broken away for the convenience of illustration.

Fig. 4 is an enlarged view, showing in detail, the table board, arranged transversely of the truck and clamped thereto, forming a base or foundation for the brace pole and its operating parts.

Fig. 5 is a sectional detail of the swiveled drum on the table board.

In order to exemplify the construction of the apparatus I have utilized a portion of an automobile indicated by the numeral 1, the front wheels being indicated as 2, the frame as 3, the front axle 4 and the crank or engine shaft as 5. These parts are the same as in usual power driven vehicles or automobiles, and in coupling or attaching the device of the present invention with the vehicle I employ a main frame rectangular in shape and embodying the side bars 6, running longitudinally of the vehicle, and fixed at 7, 7, to the front axle of the automobile, and also at other points thereof, in order to secure a firm attachment and support for the sawing machine.

The side bars of the main frame are connected by cross bars 8 8, and the operating shaft of the sawing machine is supported or journaled in bearings 9' on dome of these cross bars. The operating shaft is located at the front of the automobile, alined with the crank shaft of the engine, and provided with one or more universal joints 10, 10 to give flexibility to the shaft and allow for irregularities that may develop in the usage of the machine. At 11 a clutch device is illustrated, connecting the engine shaft with the operating shaft, and suitable devices are present for connecting or disconnecting the two shafts as required.

At the forward end of the operating shaft a bevel gear 12 is fixed to rotate therewith, and this gear, through the bevel gear 13 rotates the transverse shaft 14 supported in bearings 15 bolted to the front ends of the side bars of the main frame, the countershaft having a balance or fly wheel 16 at one end as usual. The main frame is prolonged by a front extension 17, also rectangular in shape and supported at its rear end on the countershaft 14 through the instrumentality of bearing blocks 18 18, so that this front extension may swing vertically on the countershaft with these bearing blocks as supports, and to firmly and rigidly secure the front extension cross bars 19 19 may connect the side bars of the extension, and bracing bolts 20 are also employed to hold the side bars and cross bars rigidly together. The front of the extension is supported by a single traction wheel 21 located centrally thereof and adapted to travel over the ground, the bracket 22 and king bolt 23 being used to connect the wheel with the frame.

Centrally of the front end of the extension is located a vertical shaft 24, which, through the crossed belt 25, and a pulley 26 on the countershaft 18, is driven by the pulley 27 on the vertical shaft, and the shaft is journaled in bearings 28 28 attached at the front end of the extension. This vertical shaft also forms a pivotal joint for the saw frame 29, which is vertically arranged and provided with bearing sleeves 30 over the shaft so that the frame may be swung horizontally on the shaft 24 as a swivel point. This saw frame is also rigidly braced and is equipped with vertically arranged bars 31 and brace bolts 32 to provide a rigid support for the saw arbor 33 that is journaled to the saw frame in bearings 34 on the frame.

The saw arbor has collars 35 thereon to support it and at the lower end of the rotary saw or circular saw 36 is fixed to rotate with the arbor. The arbor is driven from the operating shaft through the driven vertical shaft 24 by means of the belt 36' and the pulleys 37 37', the former on shaft 24 and the latter on shaft 33. The saw is thus rotated from the automobile engine or motor, to cut standing timber, and the portability of the vehicle readily adapts the apparatus for transportation, so that the operations may be conducted with convenience and facility. To more readily facilitate the cutting operations, the swiveled, vertical saw frame is provided with means for swinging it and the saw supported thereby, so that the operator or attendant, sitting on the automobile may control and direct the operations of the saw. To this end a steering or operating bar or rod 38 and wheel 39, somewhat similar to the steering post and wheel of an automobile, are used, the rod being supported in bearings 40 on the automobile 1, and the wheel being located in convenient position to be accessible to the attendant. An extension rod 38', being a continuation of the operating rod of the saw, is journaled in bearings 41 that are supported by braces 42 on the front extension 17 and between these two rod sections an extension joint 43 is provided, to allow a slight flexibility to the operating rods for the saw. This joint, as seen in Fig. 2 comprises disks 44, 45 on the ends of the respective shafts or rod sections 38 38', and these disks are connected by pairs of pivoted links 46 and 47, which insure proper turning of the rod when the wheel is manipulated, and the joint also permits an expansion or extension of the length of the rod sections when required. A universal joint 48 is provided in the rod 38' to lend flexibility to the rod and is designed to allow for and take up irregularities in movement between the front extension frame and the rigid automobile.

On the front end of the rod section 38' is provided a bevel pinion 49 which engages the circular or segmental rack bar 50, which is supported, with its center directly above the axis of the shaft 24, by the brace arm 51 and bars 52 from the saw frame 29. It will thus be apparent that as the wheel is turned, the saw frame and saw may be turned as required through the instrumentality of these parts.

One of the features of the invention resides in the pole 55, with its tip or point 56 designed to be jammed against the tree that is being sawed down, to not only aid in bracing the apparatus in secure position for its work, but to push the falling tree away from the apparatus as the cutting proceeds.

The pole extends, approximately, in a longitudinal direction with relation to the automobile, and is movable when desired on the supporting rollers 57, 57 fixed at the ends of the table board 58. The board supports the windlass or drum 59 over which the cable 60 passes, and the cable extends from end to end of the pole and is attached to the eye bolts 61 61, the rear end of the table having a spring 62 interposed between it and the eye bolt at the end as indicated in Fig. 5. The guide rollers 57 have their housings 57' in the form of yokes with threaded ends and these ends are secured to the table board at its ends so that the rollers afford a support for the pole as it is moved forward and backward through the instrumentality of the crank handle 63 to the windless 59, a pawl and ratchet device 64 being provided to hold the windlass as usual. It will readily be seen that by turning the crank in the proper direction the pole may be moved forward and at the point 56 made to impinge against and into the tree trunk, and it will also be evident that the spring 62 at the rear end of the pole to which the cable 60 is attached, will afford a cushion or shock absorber to take up the jar when the pole is run out against a tree, and also to absorb vibrations between the vehicle and the tree, through the pole. After the tree trunk is properly sawed, the pole is utilized to push over the tree in the usual manner, and of course during the sawing operation, the pole prevents falling of the tree toward the implement.

The longitudinal table board 58 is pivotally supported on a transverse beam 65 through the bolt 66 and pivot blocks 67 between the table board and the beam, and through this pivotal support the pole may be swung around to desired position for different uses and purposes.

The transverse beam for supporting the pole is detachably fixed to a fixed portion of the automobile, in this instance being indicated by the fixed uprights 65' 65' suitably attached to a part of the automobile, and a diagonal brace 65ª is provided between one of the uprights and the beam 65, as in Fig. 2, to strengthen and brace the supporting parts. At each end of the beam 65 a clamping device is arranged to connect the beam with the uprights 65' and each of these devices comprises a pair of clamp plates 68 and 68' that are slidable in the slots 69 of the beam and clamped against the sides of each upright by a clamp bolt 70 in an angle bracket 69'.

Claims—

1. The combination in a sawing machine with a main frame and its driven operating shaft, of a transverse countershaft, an intermediate frame pivoted on the countershaft and a saw frame vertically swiveled on the intermediate frame, a saw arbor and saw on the saw frame, a circular rack on the swiveled saw frame, a flexible operating rod, and a pinion on the rod engaging said rack for rotating the saw arbor and saw.

2. The combination in a portable sawing machine including an automobile and the main frame attached thereto, of a front extension pivoted on the main frame and provided with a supporting caster wheel, a saw frame with its saw mounted thereon and adapted to receive power from the automobile, said saw frame having a swiveled connection with the front extension, and means operable from the automobile for turning the saw frame.

In testimony whereof I affix my signature.

JOHN J. KEON.